United States Patent
Yoshida et al.

(10) Patent No.: US 10,180,897 B2
(45) Date of Patent: Jan. 15, 2019

(54) AUTOMATED SOFTWARE PROGRAM REPAIR

(71) Applicant: FUJITSU LIMITED, Kawasaki-shi, Kanagawa (JP)

(72) Inventors: Hiroaki Yoshida, Cupertino, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 15/276,628

(22) Filed: Sep. 26, 2016

(65) Prior Publication Data

US 2018/0089065 A1    Mar. 29, 2018

(51) Int. Cl.
*G06F 11/36* (2006.01)

(52) U.S. Cl.
CPC ...... *G06F 11/3664* (2013.01); *G06F 11/3688* (2013.01); *G06F 11/3692* (2013.01)

(58) Field of Classification Search
CPC .............................. G06F 11/36; G06F 11/3664
USPC .......................................................... 714/38.1
See application file for complete search history.

(56) References Cited

U.S. PATENT DOCUMENTS

| | | | | |
|---|---|---|---|---|
| 6,161,193 A * | 12/2000 | Garg | ................... | G06F 11/1492 714/6.31 |
| 8,271,961 B1 * | 9/2012 | Chithambaram | ..... | G06F 11/008 717/132 |
| 8,874,968 B1 * | 10/2014 | Nilsson | ............... | G06F 11/3672 714/38.1 |
| 8,881,095 B1 * | 11/2014 | Hunt, Jr. | ............. | G06F 11/3688 705/7.13 |
| 2006/0101414 A1 * | 5/2006 | Poole | ................. | G06F 9/44589 717/127 |
| 2009/0292941 A1 * | 11/2009 | Ganai | ................ | G06F 11/3636 714/2 |
| 2013/0159774 A1 * | 6/2013 | Budnik | ............... | G06F 11/3688 714/33 |
| 2014/0149435 A1 * | 5/2014 | Sisman | ................ | G06F 11/362 707/751 |

(Continued)

OTHER PUBLICATIONS

"A Systematic Study of automated Program Repair: Fixing 55 out of 105 Bugs for $8 each." GenProg Weimer et al., ICSE'09, Le Goues et al., ICSE'12, 2012.

(Continued)

*Primary Examiner* — Kamini B Patel
(74) *Attorney, Agent, or Firm* — Maschoff Brennan

(57) ABSTRACT

According to an aspect of an embodiment, a method may include identifying a fault location of a fault in a software program using a test suite. The method may further include implementing, in the software program, a repair candidate for the fault. In addition, the method may include augmenting the test suite with a plurality of test oracles that are based on observed behavior of the software program and that correspond to the fault location. Moreover, the method may include running the augmented test suite with respect to the software program with the implemented repair candidate. The method may also include prioritizing the repair candidate as a repair of the software program based on a failure rate of the plurality of test oracles with respect to running the augmented test suite.

20 Claims, 3 Drawing Sheets

(56) References Cited

U.S. PATENT DOCUMENTS

2016/0085665 A1* 3/2016 Junker ............... G06F 11/3684
                                                    714/38.1
2017/0242782 A1* 8/2017 Yoshida ............. G06F 11/3692

OTHER PUBLICATIONS

"SemFix: Program Repair via Semantic Analysis" SemFix (Nguyen et al., ICSE'13), 2013.
"Automatic Patch Genearation Learned from Human-Written Patches" PAR (Kim et al., ICSE'13), 2013.
"Automatic Repair of Buggy if Conditions and Missing Preconditions with SMT" NOPOL (DeMarco et al., CSTVA'14), 2014.
"Minthint: Automated synthesis of repair hints." MintHint (Kaleeswaran, et al., ICSE'14), 2014.
"relifix: Automated Repair of Software Regressions" Relifix (Tan et al., ICSE'15), 2015.
"Directfix: Looking for simple program repairs" DirectFix (Mechtaev et al., ICSE'15), 2015.
"An Analysis of Patch Plausibility and Correctness for Generate-and-Validate Patch Generation Systems" Kali (Long et al., ISSTA'15), Jul. 2015.
"Staged Program Repair with Condition Synthesis" SPR (Long et al., FSE'15), 2015.
"Automatic Patch Generation by Learning Correct Code" Long et al., Prophet POPL'16, Jan. 2016.
Pending U.S. Appl. No. 15/051,503, filed Feb. 23, 2016.
Pending U.S. Appl. No. 14/957,529, filed Dec. 2, 2015.
Pending U.S. Appl. No. 14/835,561, filed Aug. 25, 2016.

* cited by examiner

AUTOMATED SOFTWARE PROGRAM REPAIR

FIELD

The embodiments discussed in the present disclosure are related to automated software program repair.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include identifying a fault location of a fault in a software program using a test suite. The method may further include implementing, in the software program, a repair candidate for the fault. In addition, the method may include augmenting the test suite with a plurality of test oracles that are based on observed behavior of the software program and that correspond to the fault location. Moreover, the method may include running the augmented test suite with respect to the software program with the implemented repair candidate. The method may also include prioritizing the repair candidate as a repair of the software program based on a failure rate of the plurality of test oracles with respect to running the augmented test suite.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, automated repair systems and techniques often do not test every aspect of a software program. As such, automated repair systems and techniques may make modifications to software programs in attempts to fix faults that do not appropriately repair the fault in the software program but that may also not show up as being incorrect when being tested.

According to one or more embodiments described in the present disclosure, one or more test suites that may be used to determine whether a software program includes errors may be augmented to better determine whether a particular repair candidate may be an effective repair candidate. In particular, the test suites may be augmented with multiple test oracles that may correspond to a particular fault location. Additionally, a failure rate of the test oracles with respect to a particular repair candidate that may be implemented for an identified fault at the particular fault location may be used to prioritize using the repair candidate as a repair.

The prioritization of repair candidates may improve the efficiency of automated software program repair by improving determinations regarding the efficacy of repair operations. Further, in some embodiments, the augmentation and testing may be performed with respect to units of the software program that include fault locations instead of with respect to the entire software program, which may reduce the amount of processing performed.

Embodiments of the present disclosure are explained with reference to the accompanying drawings.

Figure 1:
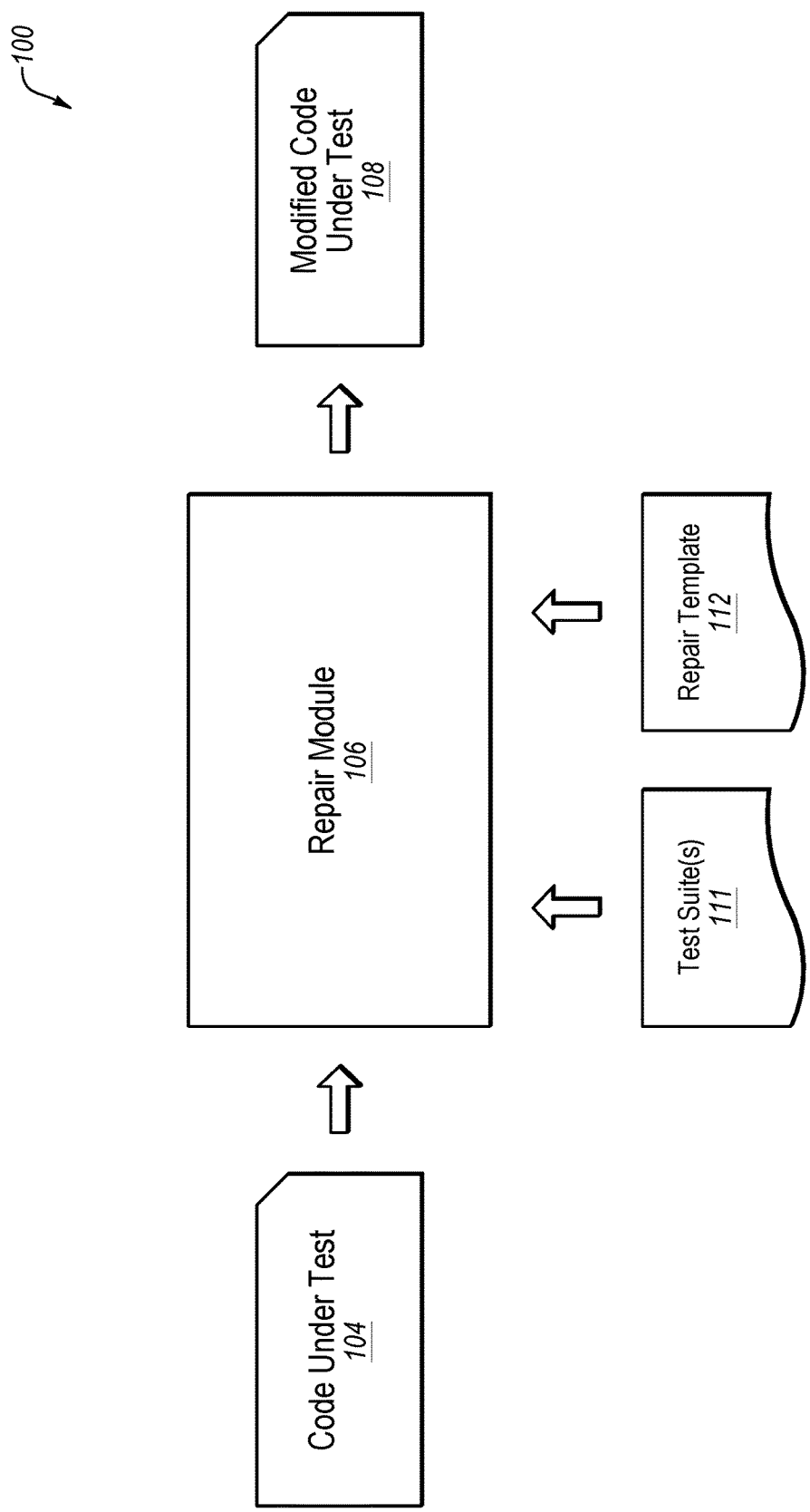
FIG. 1 is a diagram representing an example environment related to repairing a software program.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults. In the present disclosure, the modifications that may be performed may be referred to as "repair candidates" or "repairs."

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

In some embodiments, the repair module 106 may be configured to observe behavior of the code under test 104 during a test execution. In these or other embodiments, the repair module 106 may be configured to generate one or more test oracles based on the observed behavior. In some embodiments, the test oracles may each correspond to a fault location in which multiple test oracles may correspond to a same fault location in some instances. Each test oracle may predict which states of the software program at the corresponding fault location may result in passing test executions at the corresponding fault location instead of resulting in failing test executions that may have led to identification of the fault location. In some embodiments, the repair module 106 may be configured to augment one or more of the test suites 111 by including one or more of the test oracles in the test suites 111.

Additionally or alternatively, the repair module 106 may be configured to implement a repair candidate of the repair template 112 with respect to a particular fault location that may be identified during a failing test execution. In some embodiments, the repair module 106 may be configured to implement repair candidates for multiple fault locations.

In some embodiments, the repair module 106 may be configured to run a test execution of the code under test 104 with one or more implemented repair candidates and using an augmented test suite that includes multiple test oracles. In these or other embodiments, the repair module 106 may be configured to prioritize the repair candidates based on failure rates of the test oracles. In some embodiments, the repair module 106 may be configured to perform one or more operations according to a method 300 of FIG. 3 (described in detail below) to determine the prioritization.

The repair module 106 may also be configured to perform repairs on the code under test 104 based on the prioritization of the repair candidates. Additionally or alternatively, the repair module 106 may be configured to output the modified code under test 108, which may include one or more repairs that may be implemented based on the prioritization of the repair candidates.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same element or may have common sections that may be considered part of two or more of the repair module 106, the test suites 111, and the repair template 112.

Figure 2:
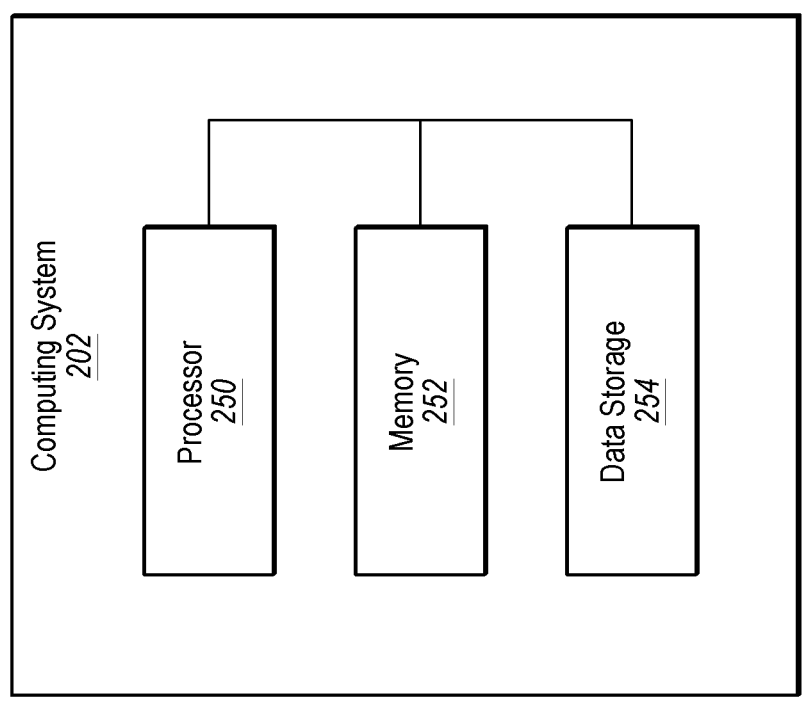
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
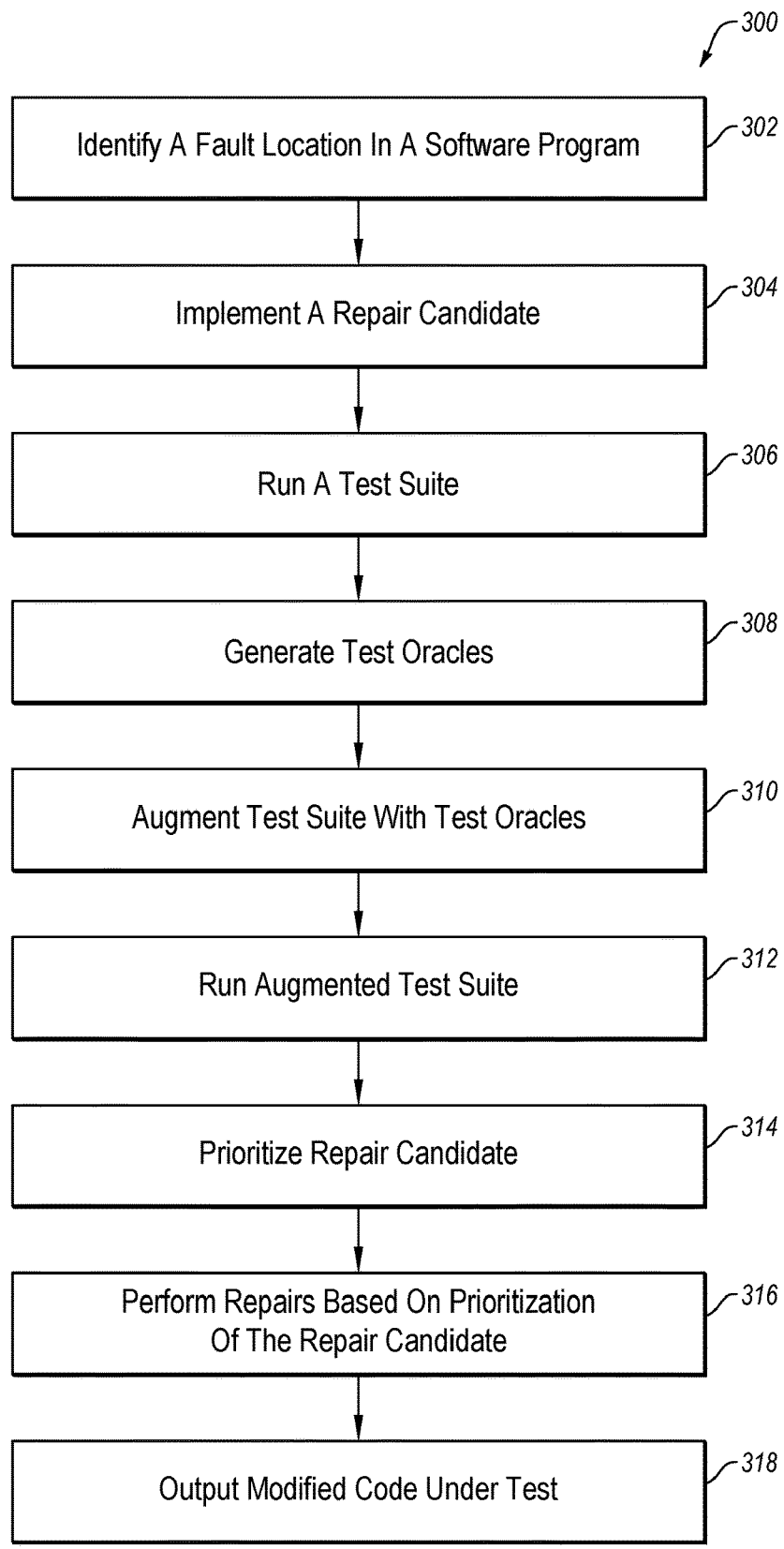
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device with respect to code under test. For example, the repair module 106 of FIG. 1 or the computing system 202 of FIG. 2 (e.g., as directed by a repair module) may perform one or more of the operations associated with the method 300 with respect to the code under test 104. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a fault and its corresponding fault location may be identified in the code under test. The fault identification may be performed with respect to the code under test using any suitable technique. For example, in some embodiments, the fault identification may be performed based on performing a test execution of the one or more test suites with respect to the code under test.

At block 304, a repair candidate may be implemented at the identified fault location. In some embodiments, the repair candidate may be implemented based on a repair template such as described above.

At block 306, a test execution may be performed by running one or more test suites with respect to the code under test with the repair candidate implemented. In some embodiments, the test execution may be performed with respect to the particular unit of the code under test that includes the implemented repair candidate and the fault location. For example, in some embodiments, only tests of the test suite that cover the particular unit of the code under test may be executed at block 306. Similar to as described above, reference to a unit that "includes" the implemented repair candidate may refer to any unit that directs the execution of the fault location.

At block 308, multiple test oracles may be generated for the code under test in some embodiments. The test oracles may be generated using any suitable technique. For example, in some embodiments, behavior of the code under test may be observed during the test execution that is used to identify the fault location at block 302, such as described above. Additionally, the test oracles may be generated based on the observed behavior.

In some embodiments, the test oracles may be generated with respect to a particular unit of the code under test that includes the fault location. For example, in some embodiments, only test oracles that relate to the particular unit of the code under test may be generated at block 304. In some embodiments, the unit may include a module of the code under test, a file of the code under test, a structure of the code under test, a function of the code under test, or any combination thereof. Further, reference to a unit that "includes" the fault location may refer to any unit that directs the execution of the fault location. For example, a fault location may be within the code of a first function of the code under test and a second function may be configured to call the first function. The second function may thus include the fault location.

Additionally or alternatively, in some embodiments, the test oracles may be generated at block 308 in response to the test execution at block 306 resulting in a passing test execution. As discussed in further detail below, the test oracles being generated in response to the test execution resulting in a passing test execution may be used to help identify whether the passing test execution is a false positive that incorrectly indicates that the implemented repair candidate repairs the fault or does not generate new faults.

At block 310, the test suite may be augmented with the test oracles that may be generated at block 308. In some embodiments, the test suite may be augmented in response to the test execution at block 306 resulting in a passing test execution.

At block 312, another test execution may be performed by running the augmented test suite. In some embodiments, only the tests and test oracles of the augmented test suite that correspond to the unit that includes the implemented repair and the fault location may be executed at block 312

At block 314, a prioritization may be determined for the repair candidate based on the test execution that is performed at block 312. In some embodiments, a failure rate of the test oracles may be determined and the repair candidate may be prioritized based on the failure rate. For example, the failure rate may indicate an effectiveness of the repair candidate in which a higher failure rate may indicate a lower effectiveness than a lower failure rate. As such, an effectiveness may be determined from the failure rate and the repair candidate may be prioritized accordingly. For example, the repair candidate may be given a lower prioritization for a first failure rate that indicates a first number of failing test oracles than for a second failure rate that indicates a second number of failing test oracles that is lower than the first number of failing test oracles based on the first failure rate indicating a lower effectiveness than the second failure rate.

In some embodiments, a number of passing test oracles and a number of failing test oracles that correspond to the fault location and the implemented repair may be determined. In these or other embodiments, the number of passing test oracles and the number of failing test oracles may be compared to determine the failure rate. For example, in some embodiments, the failure rate may include a percentage of failing test oracles with respect to a total number of test oracles. Additionally or alternatively, the failure rate may include a percentage of passing test oracles with respect to the total number of test oracles. In the present disclosure, reference to a failure rate being higher than another failure rate is an indication that the number of failing test oracles is higher for the higher failure rate. For example, a first failure rate of 25% where the 25% indicates the percentage of failing test oracles may be deemed to be lower than a second failure rate of 40% where the 40% indicates the percentage of failing test oracles. Additionally, it is understood that a passing rate also provides an indication of a failure rate and the term "failure rate" may also include a passing rate. For example, a passing rate of 75% indicates a failure rate of 25% and vice versa.

In these or other embodiments, the repair candidate may be prioritized based on its failure rate as compared to the failure rates of other repair candidates that may correspond to the same fault location. For example, the repair candidate (designated as a first repair candidate in this example) may have a first failure rate that is higher than a second failure rate of a second repair candidate that has already been processed and analyzed for the fault location according to blocks 304, 306, 308, 310, and 312. Additionally, the first failure rate may be lower than a third failure rate of a third repair candidate that also has already been processed and analyzed for the fault location according to blocks 304, 306, 308, 310, and 312. The first repair candidate may be prioritized over the second repair candidate and the third repair candidate may be prioritized over the first repair candidate according to the failure rates.

Additionally or alternatively, in some embodiments, the prioritization may be based on whether or not the failure rate exceeds a threshold failure rate. In the present disclosure, reference to the failure rate exceeding a threshold failure rate indicates that the number of failing test oracles is too high. In some embodiments, the threshold failure rate may be based on an estimated number of errors in the software program. For example, in some embodiments, the threshold failure rate may be a ratio of an estimated number of erroneous execution paths to the number of all possible execution paths in the software program. In these or other embodiments, the estimated number of errors (which may include an estimated number of erroneous execution paths) may be determined based on results from the test execution performed at block 306. In some embodiments, in response to the failure rate not exceeding the threshold failure rate, the prioritization may be such that the repair candidate is deemed to be acceptable. Additionally or alternatively, in response to the failure rate exceeding the threshold failure rate, the prioritization may be such that the repair candidate is deemed to be unacceptable.

In some embodiments, the failure rate may indicate whether or not the repair candidate creates a false positive with respect to passing test results. For example, in some embodiments, the repair candidate may result in a passing test execution based on the test suite, but the failing rate of the test oracles may exceed the threshold failure rate. As such, the repair candidate may be deemed unacceptable even though a passing test result may occur with the implementation of the repair candidate. As such, in some embodiments, the failure rate may also be used to determine false positives with respect to passing test executions and the prioritization may indicate as much.

At block 316, repairs may be performed based on the prioritization of the repair candidate that may be determined at block 314. For example, in some embodiments, when the prioritization indicates that the repair candidate is deemed to be acceptable based on the comparison between its failure rate and the threshold failure rate, the repair candidate may be accepted and permanently implemented at block 316. Conversely, when the prioritization indicates that the repair candidate is deemed to be unacceptable based on the comparison between its failure rate and the threshold failure rate, the repair candidate may be rejected and another repair candidate may be selected.

In these or other embodiments, multiple repair candidates that may correspond to the fault location may be prioritized based on blocks 304, 306, 308, 310, 312, and 314. At block 316, the repair candidate of the multiple repair candidates that has the highest priority may be implemented.

At block 318, modified code under test may be output. The modified code under test may include modifications that may include one or more repair candidates that may be implemented based on the repair prioritization described above such that the modified code under test may include a repaired version of the code under test that may be received at block 302.

The method 300 may improve the efficiency and efficacy of software program testing and repair. For example, the determining of the prioritization of repair candidates based on test oracle failure rate may help make better determinations as to the effectiveness of repair candidates. Further, it may be difficult or impossible to determine whether or not test oracles accurately predict the proper behavior of software programs because they may be generated based on behavioral observations of faulty code. However, by looking at the failure rates of test oracles and basing prioritization based on overall rate, the effects of erroneous test oracles may be reduced. Additionally, performing operations with respect to particular units of the code under test that include fault locations as opposed to the entire code under test may also help with processing efficiency.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the generation of test oracles, augmentation of the test suite, running of the augmented test suite, repair candidate prioritization, and repair operations of blocks 308, 310, 312, 314, and 316 may be performed in response to the test execution at block 306 resulting in a passing test execution. By performing the operations of blocks 308, 310, 312, 314, and 316 in response to the test execution at block 306 resulting in a passing test execution, efficiency may be improved by not performing such operations with respect to repair candidates already deemed to not be effective repairs.

In addition, in some embodiments, the method 300 may be performed iteratively in which a single fault location and a single repair candidate that corresponds to the fault location may be analyzed at a time. Additionally or alternatively, one or more operations associated with one or more blocks may be performed with respect to multiple fault locations or multiple repair candidates at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   identifying a fault location of a fault in a software program using a test suite;
   implementing, in the software program, a repair candidate for the fault;
   augmenting the test suite with a plurality of test oracles that are based on observed behavior of the software program and that correspond to the fault location;
   running the augmented test suite with respect to the software program with the implemented repair candidate; and
   prioritizing the repair candidate as a repair of the software program based on a failure rate of the plurality of test oracles with respect to running the augmented test suite.

2. The method of claim 1, wherein prioritizing the repair candidate based on the failure rate is based on the failure rate exceeding a threshold failure rate that is based on an estimated number of erroneous execution paths in the software program.

3. The method of claim 1, further comprising:
   running, prior to augmenting the test suite and after implementing the repair candidate, the test suite with respect to the software program having the repair candidate implemented; and
   wherein augmenting the test suite and running the augmented test suite are in response to all tests of the test suite passing with the repair candidate being implemented in the software program.

4. The method of claim 3, further comprising running, prior to augmenting the test suite and after implementing the repair candidate, the test suite only with respect to a unit of the software program that includes the fault location.

5. The method of claim 1, further comprising generating the plurality of test oracles based on observed behavior of the software program prior to implementation of the repair candidate.

6. The method of claim 1, further comprising performing one or more of the following based on a unit of the software program that includes the fault location:
   generating the plurality of test oracles with respect to the unit of the software program; and
   running the augmented test suite only with respect to the unit of the software program.

7. The method of claim 6, wherein the unit of the software program includes one or more of the following: a module of the software program; a file of the software program; a structure of the software program; and a function of the software program.

8. The method of claim 1, further comprising:
   determining an effectiveness of the repair candidate based on the failure rate; and
   wherein prioritizing the repair candidate as a repair of the software program is based on the determined effectiveness.

9. The method of claim 1, wherein prioritizing the repair candidate as a repair of the software program includes accepting the repair candidate as a repair of the software program based on the failure rate.

10. The method of claim 1, wherein the plurality of test oracles are based on observed behavior of the software program with respect to a unit of the software program that includes the fault location.

11. Non-transitory computer-readable storage media configured to store instructions that, when executed, cause a system to perform operations, the operations comprising:
- identifying a fault location of a fault in a software program using a test suite;
- implementing, in the software program, a repair candidate for the fault;
- augmenting the test suite with a plurality of test oracles that are based on observed behavior of the software program and that correspond to the fault location;
- running the augmented test suite with respect to the software program with the implemented repair candidate; and
- prioritizing the repair candidate as a repair of the software program based on a failure rate of the plurality of test oracles with respect to running the augmented test suite.

12. The non-transitory computer-readable storage media of claim 11, wherein prioritizing the repair candidate based on the failure rate is based on the failure rate exceeding a threshold failure rate that is based on an estimated number of erroneous execution paths in the software program.

13. The non-transitory computer-readable storage media of claim 11, wherein the operations further comprise:
- running, prior to augmenting the test suite and after implementing the repair candidate, the test suite with respect to the software program having the repair candidate implemented; and
- wherein augmenting the test suite and running the augmented test suite are in response to all tests of the test suite passing with the repair candidate being implemented in the software program.

14. The non-transitory computer-readable storage media of claim 13, wherein the operations further comprise running, prior to augmenting the test suite and after implementing the repair candidate, the test suite only with respect to a unit of the software program that includes the fault location.

15. The non-transitory computer-readable storage media of claim 11, wherein the operations further comprise generating the plurality of test oracles based on observed behavior of the software program prior to implementation of the repair candidate.

16. The non-transitory computer-readable storage media of claim 11, wherein the operations further comprise performing one or more of the following based on a unit of the software program that includes the fault location:
- generating the plurality of test oracles with respect to the unit of the software program; and
- running the augmented test suite only with respect to the unit of the software program.

17. The non-transitory computer-readable storage media of claim 16, wherein the unit of the software program includes one or more of the following: a module of the software program; a file of the software program; a structure of the software program; and a function of the software program.

18. The non-transitory computer-readable storage media of claim 11, wherein the operations further comprise:
- determining an effectiveness of the repair candidate based on the failure rate; and
- wherein prioritizing the repair candidate as a repair of the software program is based on the determined effectiveness.

19. The non-transitory computer-readable storage media of claim 11, wherein prioritizing the repair candidate as a repair of the software program includes accepting the repair candidate as a repair of the software program based on the failure rate.

20. The non-transitory computer-readable storage media of claim 11, wherein the plurality of test oracles are based on observed behavior of the software program with respect to a unit of the software program that includes the fault location.

* * * * *